Aug. 7, 1956
V. O. BOWLES
2,758,067
METHOD AND APPARATUS FOR THE CONVERSION
OF LIQUID HYDROCARBONS
Filed June 27, 1951
4 Sheets-Sheet 2
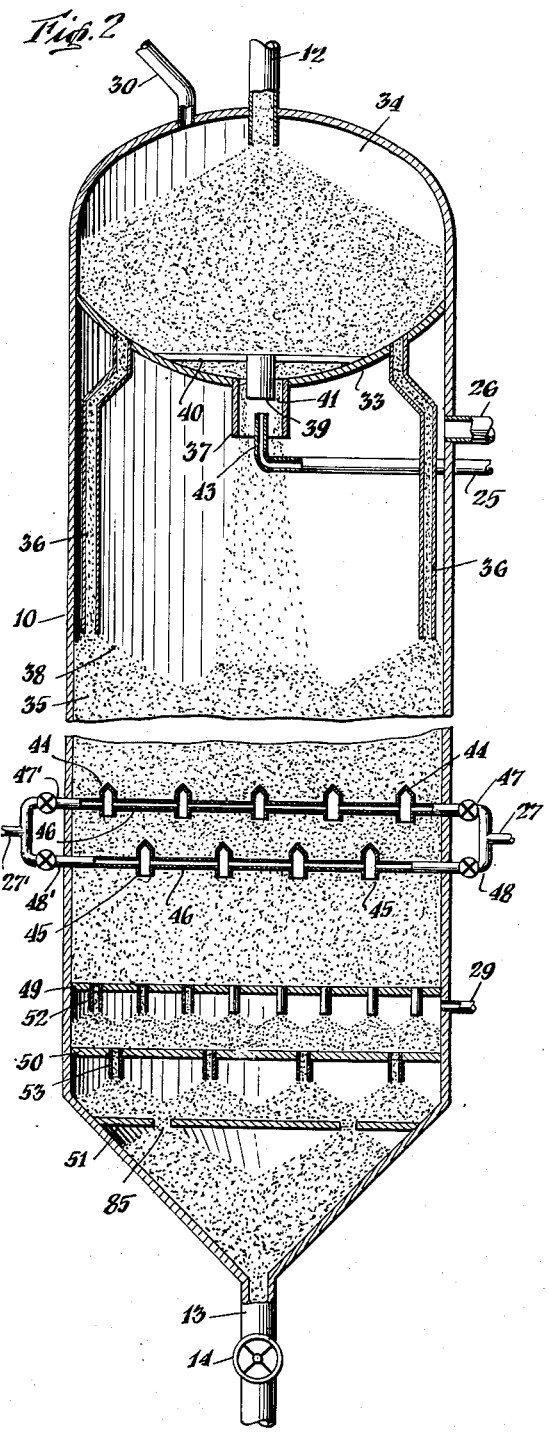
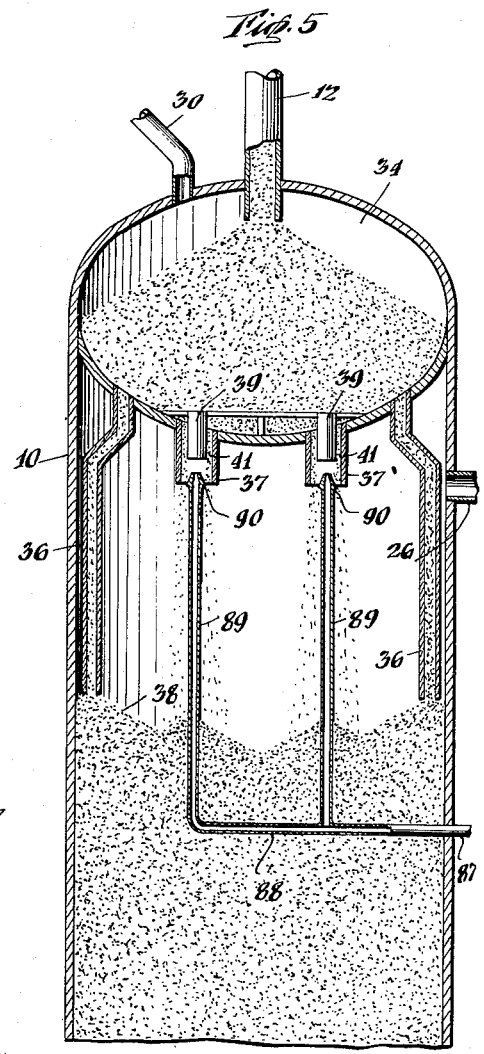
INVENTOR.
Vernon O. Bowles
BY
John A. Crowley Jr.
ATTORNEY Aug. 7, 1956

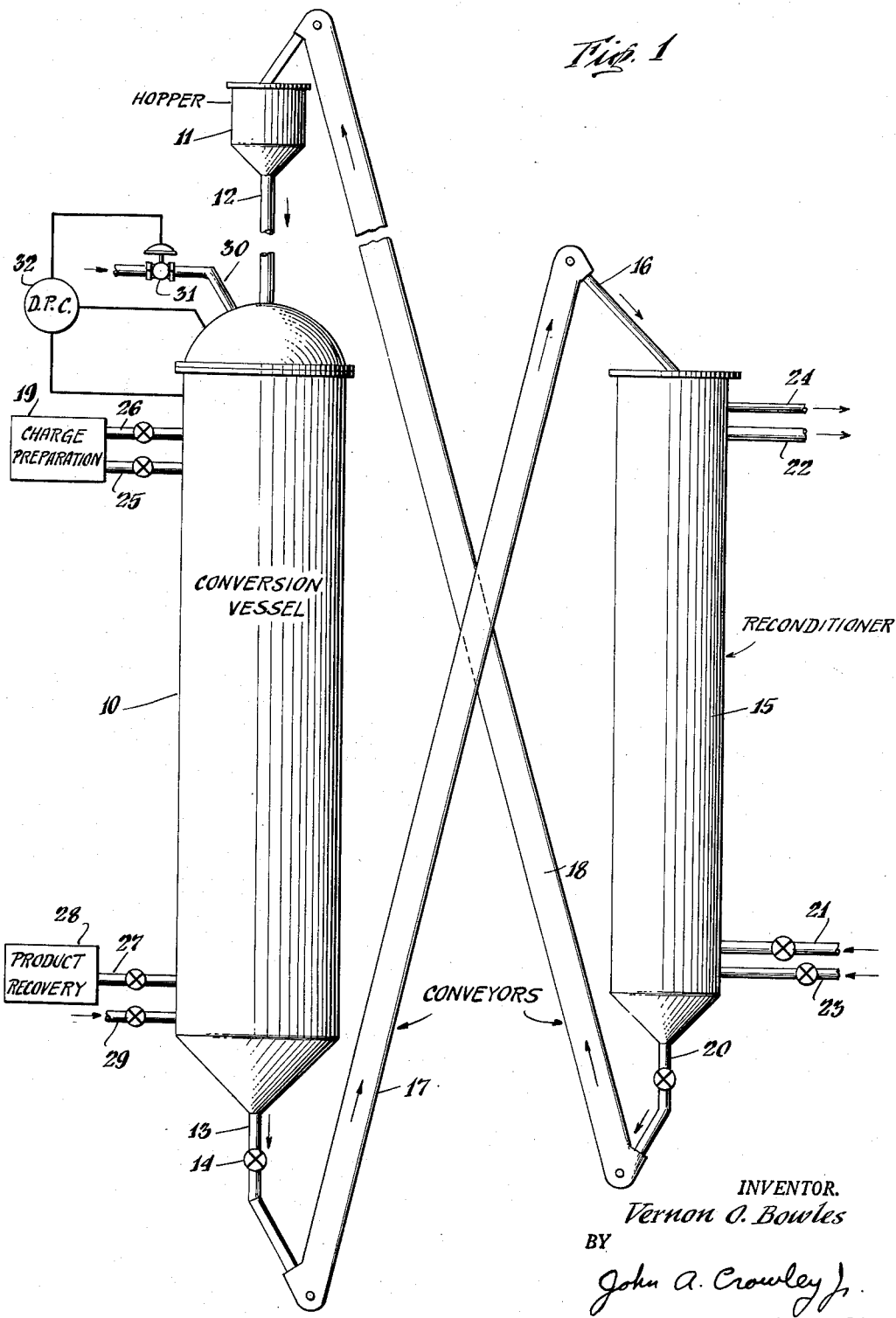

V. O. BOWLES 2,758,067

METHOD AND APPARATUS FOR THE CONVERSION
OF LIQUID HYDROCARBONS

Filed June 27, 1951

INVENTOR.
Vernon O. Bowles

BY John A. Crowley Jr.

ATTORNEY

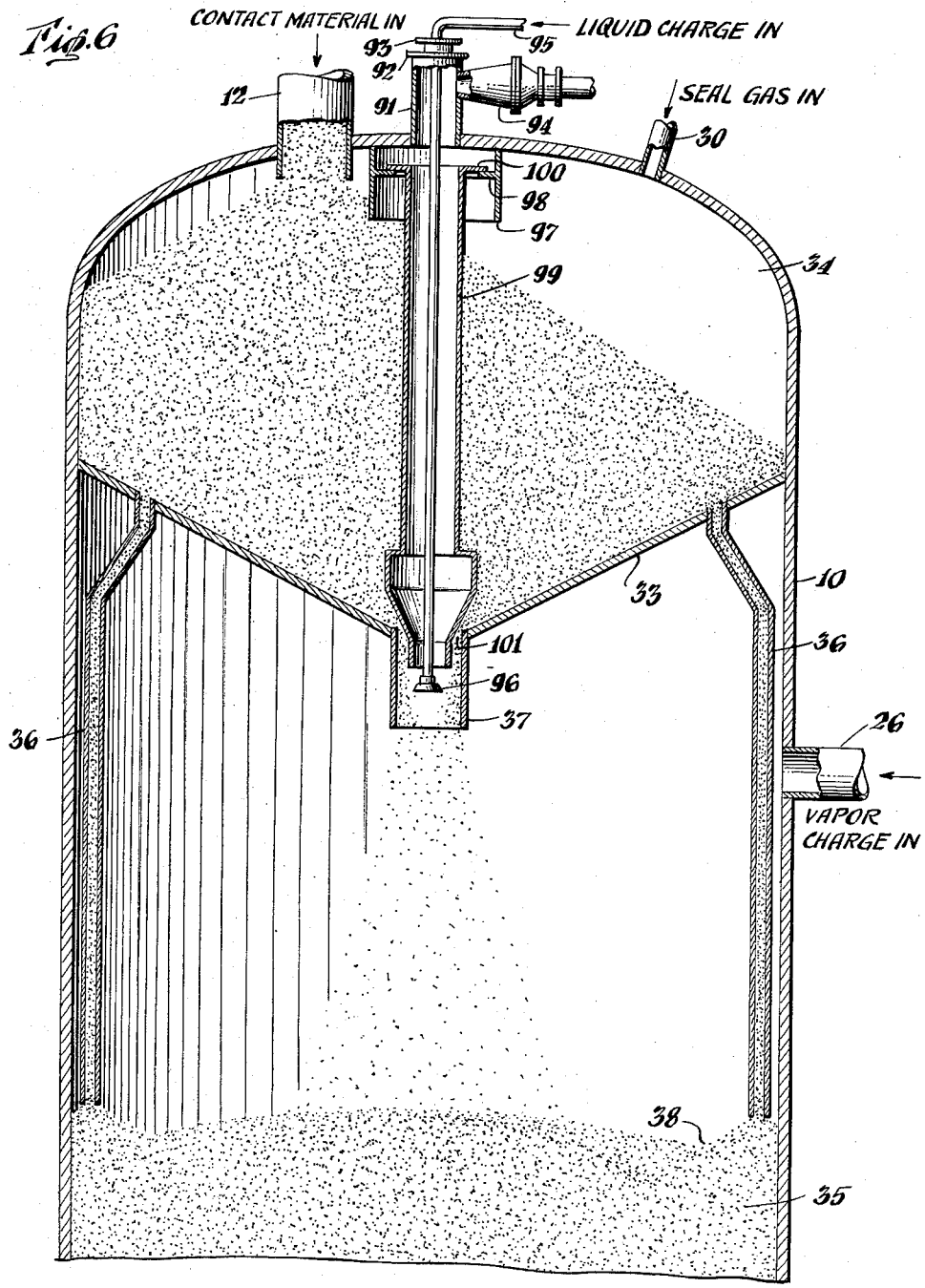

2,758,067
Patented Aug. 7, 1956

United States Patent Office

2,758,067

METHOD AND APPARATUS FOR THE CONVERSION OF LIQUID HYDROCARBONS

Vernon O. Bowles, Rye, N. Y., assignor to Socony Mobil Oil Company, Inc., a corporation of New York Application June 27, 1951, Serial No. 233,893

16 Claims. (Cl. 196—52)

This invention pertains to a method and apparatus for the conversion of high boiling liquid hydrocarbons or mixed phase hydrocarbons to lower boiling hydrocarbons in the presence of a moving mass of particle-form contact material which may or may not exhibit catalytic properties with respect to the conversion reaction. It is concerned particularly with a method and apparatus for the introduction of contact material and liquid hydrocarbon charge into the conversion zone.

Typical of processes to which this invention applies is the catalytic conversion of heated liquid hydrocarbons wherein a particle-form adsorbent catalytic solid is passed cyclically through successive zones or vessels in the first of which it is contacted with high boiling liquid hydrocarbon charge at temperatures of 850° F. and upward to effect the conversion of said hydrocarbon charge to lower boiling gasoline containing hydrocarbons and in the second of which carbonaceous contaminants deposited on the catalyst are burned off by means of a fluid regeneration medium such as a combustion supporting gas so that the catalyst will be in a suitable condition for re-use in the conversion zone. The catalyst in this process passes through the conversion vessel and the regeneration vessel as a substantially compact column of downwardly moving particles. Other exemplary processes are the thermal visbreaking, coking or cracking of liquid or mixed phase hydrocarbon charge by contact with heated particle-form inert contact materials.

In processes wherein the contact material is catalytic in nature it may partake of the nature of natural or synthetic clays, bauxite, activated alumina or synthetic associations of silica, alumina or silica and alumina to which other substances such as certain metallic oxides may be added in small amounts for specific purposes. When the contact material is inert in character, it may partake of the form of refractory materials such as zirkite, corhart material or mullite or it may partake of the form of stones or metallic particles or balls or particles of coke. It is desirable to maintain the size of the contact material particles within the range of about 3 to 100 mesh and preferably within the range of about 4 to 20 mesh by Tyler Standard Screen Analysis.

In charging high boiling liquid hydrocarbons to processes of the type mentioned previously, it is of prime importance that the liquid hydrocarbons be introduced to the conversion zone in such a manner that said liquid hydrocarbons are distributed uniformly across the horizontal cross-section of the column of contact material. Uneven distribution of the hydrocarbon charge over the column cross-section, such as is accomplished when the liquid hydrocarbons are simply sprayed on the surface of the contact material column, results in over-conversion of a portion of the hydrocarbons, under-conversion of the remaining portion and very uneven carbonaceous contaminant distribution on the contact material. Also, introduction of liquid hydrocarbon charge to the conversion vessel must be effected without the liquid hydrocarbons coming in contact with any of the hot metal parts in the upper portion of the conversion chamber. On contacting heated metal surfaces liquid hydrocarbons undergo rapid conversion with resultant coke deposition on the metal. These coke deposits build up on the metal surfaces and break off in large pieces which pass downwardly with the contact material and plug up restricted passages in the lower section of the conversion vessel and elsewhere in the system.

Broadly, this invention provides a separate chamber above a contact material bed wherein liquid charge is sprayed onto falling contact material. The contact material with liquid charge thereon then showers downwardly onto the contact material bed. All portions of the chamber are scrubbed free of coke deposits by falling contact material so that no coke build-up occurs. This invention further employs a solid member to form, in conjunction with a hollow tubular member, an annular thick curtain of contact material and at the same time the solid member acts in conjunction with a feed conduit as a nozzle for properly deflecting the oil into said contact material curtain, the entire assembly being so arranged that the contact material curtain scrubs all surfaces on which coke might build up.

A major object of this invention is the provision of a method and apparatus for the introduction of liquid hydrocarbon charge and particle-form contact material into a conversion chamber in such a manner as to avoid the difficulties described hereinabove.

This and other objects of the invention will become apparent from the following discussion.

Before proceeding with this discussion certain terms used in describing and claiming this invention will be defined. The term "gaseous" as used herein is intended to refer to a material existing in the gaseous phase under the particular conditions of temperature and pressure involved regardless of what may be the normal phase of that material under ordinary atmospheric conditions. Similarly "liquid" refers to a material in the liquid phase under the particular conditions prevailing regardless of its normal state. The expression "contact material" is employed herein in a broad sense as covering solid particles which are suitable as a contacting or heat carrying agent for the particular conversion involved regardless of whether such solid particles exhibit a catalytic effect toward the conversion or not. The term "annular" is used herein to refer to the passage defined between two members, one being placed symmetrically within the other, having the same horizontal cross-sectional shape but different horizontal cross-sectional areas, regardless of whether such passage is ring-shaped or not.

The invention may be best understood by reference to the drawings attached hereto, of which:

Figure 1 is an elevational view showing the general arrangement of a continuous hydrocarbon conversion system of the type to which this invention may be applied.

Figure 2 is an elevational view, partially in section, showing the application of this invention to the conversion vessel.

Figure 5 is an elevational view, partially in section, of a third modification of this invention.

Figure 6 is an elevational view, partially in section, of the upper section of a conversion vessel employing a fourth modification of this invention.

Figure 3:
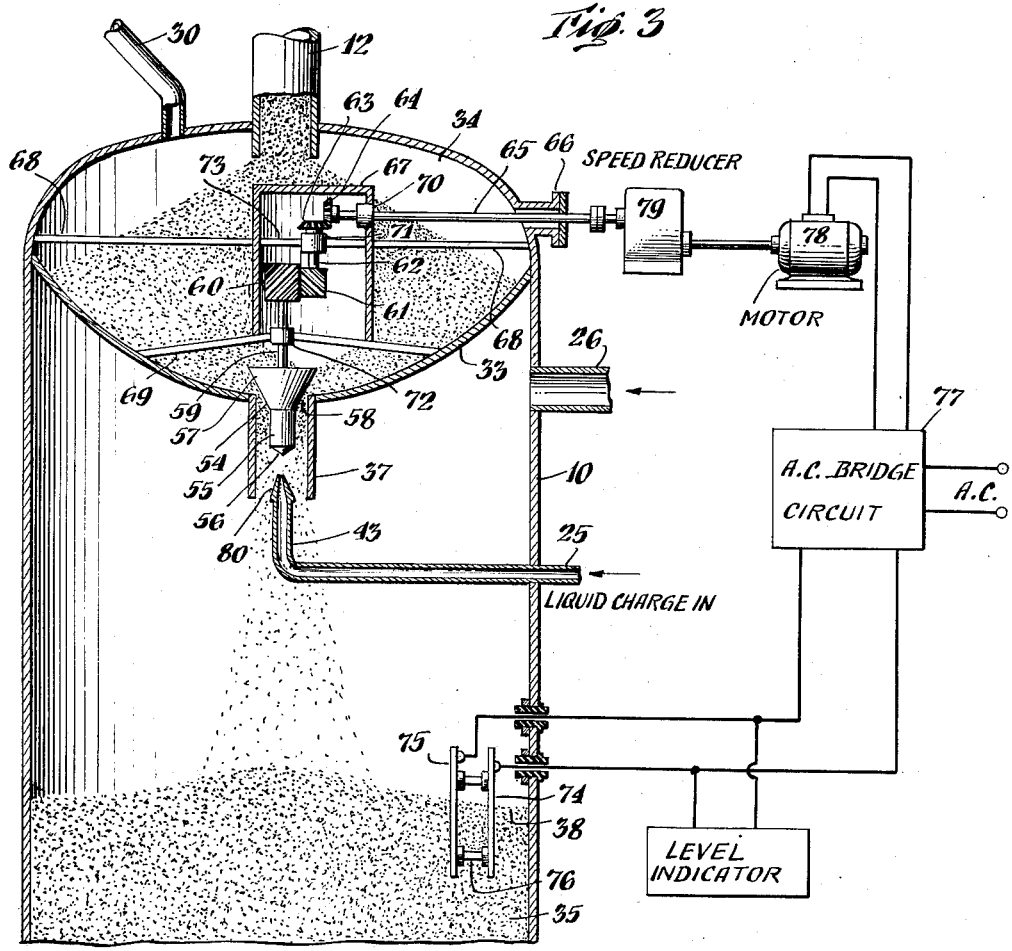
Figure 3 is an elevational view, partially in section, of the upper portion of a conversion vessel employing a modified form of this invention.

All of these drawings are highly diagrammatic in form.

Turning now to Figure 1 there is shown an upright elongated conversion vessel or housing 10 supplied particle-form catalyst from a supply hopper 11 through a gravity feed leg 12 and provided with a catalyst drain leg 13 bearing flow control valve 14 on its lower end. Also shown is a separate reconditioner 15 having a catalyst feed conduit 16 connecting into its upper end and a drain conduit 20 connected into its lower end. Conveyors 17 and 18 are provided for transfer of the catalyst particles between converter and reconditioner. The conveyors may be of any suitable construction adapted to transfer hot catalyst particles without severe breakage and attrition of the particles, for example continuous bucket elevators or pneumatic lifts. In operation, fresh catalyst at a temperature suitable for hydrocarbon conversion is passed from hopper 11 through feed leg 12 into the upper end of vessel 10. Used catalyst is withdrawn from the bottom of the vessel through conduit 13 at a rate, controlled by valve 14, which is in conformance with the requirements of the particular conversion operation involved. The used catalyst is transferred by conveyor 17 to the upper end of reconditioner 15. In such processes as the catalytic cracking conversion of hydrocarbons, a substantial amount of carbonaceous contaminant is deposited upon the used catalyst in which case the reconditioner takes the form of a catalyst regenerator. Air is introduced into the lower section of vessel 15 through conduit 21 and is permitted to pass upwardly through the column of used contact material within vessel 15 to burn off the contaminant. Flue gas is withdrawn from the upper section of vessel 15 through conduit 22. In order to remove sufficient heat from the regenerating catalyst to prevent overheating of the catalyst to heat damaging levels, cooling tubes (not shown) may be provided within the reconditioner. These tubes may be supplied with a suitable cooling fluid through pipe 23. Cooling fluid may be withdrawn from the cooling tubes through pipe 24. Other regenerator constructions than that shown and described hereinabove are contemplated within the scope of this invention. If the process involved is a strictly non-catalytic process, for example, in which the amount of coke deposit on the particle-form contact material is negligible or if it be a process wherein the amount of coke deposit is insufficient upon combustion to heat the contact material to the desired inlet temperature to the conversion vessel, the reconditioner 15 may take the form of an apparatus the principal function of which is to heat the contact material. Considering again conversion vessel 10, high boiling hydrocarbons from a suitable charge preparation system 19 may be supplied in heated condition into the upper section of vessel 10 through conduit 25. If desired, vaporized hydrocarbons may be simultaneously supplied to the upper section of vessel 10 through conduit 26. Converted gaseous hydrocarbon products which may contain high percentages of motor and aviation gasoline and fuel oils are withdrawn from the lower section of vessel 10 and passed through conduit 27 to a suitable product fractionator and recovery system 28. An inert purge gas such as steam or flue gas may be introduced into the catalyst column within the lower section of housing 10 through conduit 29 for the purpose of stripping gaseous hydrocarbon products from the out flowing used catalyst. An inert seal gas such as steam or flue gas may be introduced into the upper end of vessel 10 through conduit 30 at a rate so controlled by diaphragm valve 31 and differential pressure controller 32 so as to maintain an inert gaseous pressure adjacent to the lower end of contact material feed leg 12, above the gaseous pressure in the hydrocarbon conversion zone. In this manner escape of hydrocarbons through the catalyst feed system is prevented.

In Figure 2, details of the construction of conversion vessel 10 are shown, like elements in both Figure 1 and Figure 2 bearing the same numerals. It will be seen, referring to Figure 2, that a partition 33 extends transversely across the upper section of vessel 10 to divide it into a seal chamber 34 positioned in the upper end and a conversion chamber 35 positioned therebelow with a conversion zone therein. A plurality of spaced conduits 36 which may be arranged in a circular pattern depend from partition 33 to a level therebelow in conversion chamber 35. Tubular inlet conduit of chamber 37 depends centrally and vertically from partition 33 and terminates within the upper section of the conversion chamber. A deflecting baffle or plug 39, of lateral dimensions less than tubular inlet 37 is supported by rods 40 so that at least a portion of it extends into conduit 37 to form annular space 41. Baffle 39 and conduit 37 may assume any desired cross-sectional shape such as circular, square or hexagonal. While it is preferable that 39 and 37 have the same cross-sectional shape it is contemplated within the scope of this invention that these two members be dissimilar in shape. Liquid hydrocarbon charge conduit 25 passes through the wall of vessel 10 and terminates at the center of a horizontal cross-section of vessel 10. Connected to conduit 25 at this termination point is vertical conduit 43 which extends upwardly into conduit 37 and terminates directly beneath baffle 39. Vapor inlet conduit 26 passes through the wall of vessel 10 and terminates within the upper portion of the conversion chamber. In the lower section of vessel 10 are provided two or more vertically spaced rows of spaced gable-roofed gas collecting troughs 44 and 45. Adjacent troughs are connected by means of nipples 46, and pipes 47 and 48 and 47' and 48' connect into the end troughs in rows 44 and 45, respectively. The pipes 47 and 48 and 47' and 48' are in turn manifolded to outlet pipes 27 and 27' which feed into the product recovery system. Below the levels of the collector troughs are provided three spaced partitions 49, 50 and 51. A plurality of uniformly distributed circular rows of nipples 52 depend from the uppermost partition 49 and a lesser number of nipples 53 depend from the next lower partition 50. The nipples 53 are horizontally staggered proportionately between the nipples 52 thereabove. A circular row of holes 85 is provided in the lowermost partition 51, the row of holes being horizontally staggered with respect to the rows of nipples 53 above.

In operation contact material particles are supplied through gravity leg 12 to a compact bed of contact material within seal chamber 34. Contact material passes from seal chamber 34 through conduits 36 onto the surface of contact material bed 38 maintained as a substantially compact column within the conversion zone of conversion chamber 35. The temperature of the contact material so supplied to the conversion chamber should be suitable for supporting the intended hydrocarbon conversion. Heated liquid or mixed phase hydrocarbon charge enters through conduit 25, flows upwardly through conduit 43 and impinges against the bottom of baffle 39. Contact material passes through annular passage 41 from seal chamber 34 and encounters liquid hydrocarbons sprayed laterally in all directions from the bottom of deflecting baffle 39 within conduit 37. Liquid hydrocarbon becomes sorbed on the contact material particles in the confined space within chamber 37. Contact material particles with liquid hydrocarbon charge uniformly deposited thereon fall in a tubular shower or curtain from the lower end of conduit 37 to the top of contact material column 38. The contact material particles from this shower soon uniformly distribute themselves across the entire column cross-section. It should be noted that contacting the liquid charge and contact material within conduit 37 prevents any of the liquid from reaching hot contact material bearing conduits 36 and the walls of vessel 10 where coky deposits might be formed. While coke might be formed on the inner wall of conduit 37 or on the outside of baffle 39, no build up of coke will occur at these points because of the abrasive action of the flowing contact material particles. The bottom of baffle 39 is kept free of deposits by the action of the impinging liquid stream. If desired, in operations where the charge stock is partially vaporized at the desired conversion temperature, the charge may be subjected to a preliminary fractionation to separate the heavy liquid portion of the charge from the vaporizable portion. The liquid may then be introduced through conduit 25 while the heated hydrocarbon vapor charge may be separately introduced to the conversion chamber by means of conduit 26. The contact material and liquid hydrocarbons pass downwardly through the conversion zone and the liquid hydrocarbons are converted to gaseous hydrocarbon products. Gaseous conversion products are withdrawn from the lower section of the conversion zone through collector troughs 44 and 45 and pipes 47 and 48, and 47' and 48'. The flow through pipes 47 and 48 and 47' and 48' is throttled so as to provide the proper flow of products from each row of collector troughs. Used contact material flows downwardly through the partition arrangement 49, 50 and 51 in the lower end of vessel 10 and is withdrawn through outlet conduit 13 at a rate controlled by valve 14. The partition arrangement 49, 50 and 51 insures uniform withdrawal of contact material from all portions of the chamber cross-sectional area in the conversion zone thereabove. It is important to maintain the level of the contact material substantially constant within the conversion zone. This is automatically accomplished in the operation described hereinabove since the contact material flow in pipes 36 is throttled only by the column surface level. Thus only as much contact material passes through conduits 36 as is required to maintain the column surface level substantially constant.

A modified form of the invention may be seen in Figure 3 wherein only the upper section of conversion vessel 10 is shown with partition 33 forming seal chamber 34 and cylindrical conduit 37 depending downwardly from partition 33 in a manner similar to the upper section of the vessel shown in Figure 2. A deflecting baffle extends downwardly into conduit 37 to leave annular space 58. This baffle is of the form of a solid cylinder 55 with horizontal cross-sectional area less than the cross-sectional area of conduit 37, having an inverted cone affixed to its lower end and an inverted frustum of a right angular circular cone 57 affixed to its upper end. The area of the small base of the frustum 54 is equal to the cross-sectional area of cylinder 55 while the area of the large base is greater than the cross-sectional area of conduit 37. While the large base of 54 is shown greater than the cross-sectional area of conduit 37, the area of this large base may, within the broader scope of this invention, be equal to or less than the cross-sectional area of 37. While conduit 37 is here shown in the form of a cylinder it may take other forms such as rectangular in which case baffle 54 would take the form of a rectangular solid with the inverted frustum of a pyramid affixed to its upper end. A vertical shaft 59 is attached to the upper end of baffle 54 and has worm gear 60 attached to its upper end. Shaft 59 is connected by means of gears 60, 61, 63 and 64 and vertical shaft 62 to a drive shaft 65 which passes through the wall of vessel 10 by means of stuffing box 66. Shaft 65 may be connected to a hand crank and adjusted manually, if desired, but it is preferred to provide automatic adjustment as will be described hereinbelow. A housing 67 is provided to shelter gears 60, 61, 63 and 64 from contact material particles which may interfere with their operation. Housing 67 is supported by rods 68 which are attached to the walls of vessel 10 and by rods 69 which extend from partition 33. Rods 69 also support a bearing 72 so that shaft 59 will be maintained in the proper horizontal position. Bearing 71 supported by rods 73 and bearing 70 fixed in the wall of housing 67 are provided for shafts 62 and 65 respectively. Two spaced apart electrical condenser plates 74 and 75 held together by insulators 76 are supported by suitable means (not shown) within vessel 10 so as to extend vertically along a short section of the vessel corresponding roughly to the range of levels within which it is desired to maintain the surface level 38 of the contact material bed within the conversion zone. These plates are connected into a suitable A. C. bridge circuit 77 which may be of conventional type. This bridge circuit is adapted to operate motor 78 which is connected to shaft 65 through speed reducer 79.

In operation contact material enters seal chamber 34 through gravity leg 12 and passes downwardly through annular passage 58. Heated liquid hydrocarbon charge passes through conduits 25 and 43 and sprays from spray nozzle 80 against the apex of the conical portion 56 of solid 54. As described previously in connection with Figure 2 liquid hydrocarbons and contact material are thoroughly mixed and the liquid hydrocarbons become sorbed on the contact material in the confined space within conduit 37 and shower down as a tubular curtain onto the top of contact material column 38. The top of contact material column 38 is maintained substantially constant by moving baffle 54 upwardly or downwardly and thereby increasing or decreasing contact material flow through annular space 58. The space between electrical condenser plates 74 and 75 fills with contact material so that change in the level of the contact material column 38 causes a change in the dielectric resistance between the plates and a variation in the current flowing in the A. C. bridge circuit 77. The A. C. bridge circuit activates motor 78 which through speed reducer 79 rotates shaft 65 and raises or lowers deflecting baffle 54 as required. It will be noted that this modification eliminates conduits 36 shown in Figure 2 from the converter.

Figure 4:
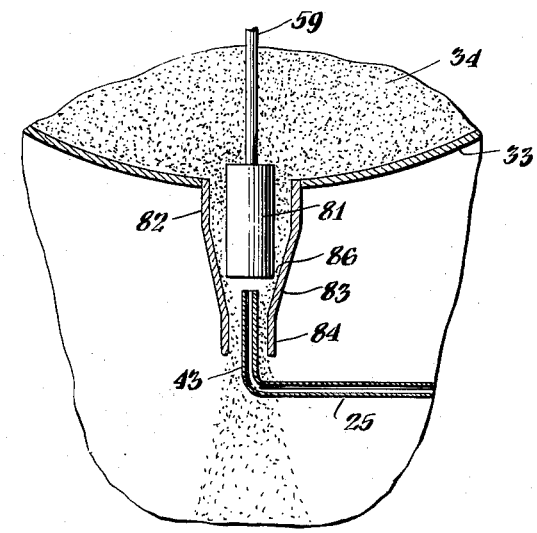
Figure 4 is a cut away detail of a second modification of this invention.

A second modification of this invention is shown in Figure 4, which is a sectional cut away view of the portion of conversion vessel 10 at and near the center of partition 33. In Figure 4 will be seen conduit 82 depending downwardly from the center of partition 33. At its lower end conduit 82 is connected by means of reducer 83 to conduit 84 which has the same horizontal cross-sectional shape as conduit 82 but is smaller in cross-sectional area. A deflecting baffle 81, having the same horizontal cross-sectional shape as conduits 82 and 84 but having a cross-sectional area less than conduit 82 and preferably equal to or greater than conduit 84, extends into conduit 82 so as to leave annular passage 86 between said baffle and reducer 83. The operation of this modification of the invention is the same as that described in connection with Figure 3, baffle 81 being moved upwardly or downwardly to control the level of the contact material column and liquid hydrocarbons and contact material mixing in the confined space within reducer 83 and conduit 84 and showering onto the contact material column.

It may be desirable in conversion vessels of large cross-sectional area to introduce liquid hydrocarbons to the vessel at a plurality of points in the horizontal cross-section of the vessel. Such an arrangement is shown in Figure 5 which illustrates an apparatus which introduces liquid hydrocarbon charge at four points in the horizontal cross-section of conversion vessel 10. Only two of these points are visible in Figure 5, the remaining two lying directly behind the two shown. The operation of this modification is similar to that described in connection with Figure 2. Heated liquid hydrocarbons are introduced through conduit 87 and are manifolded to conduits 88. Conduit 87 and conduits 88 are fixed beneath the surface of contact material column 38 so that erosion of said conduits by particles of freely falling contact material will be avoided. Liquid hydrocarbons pass upwardly through vertical conduits 89 and are sprayed from nozzles 90 against deflecting baffles 39. Falling contact material particles are contacted by liquid hydrocarbons and shower downwardly onto the surface of contact material bed 38 as described in connection with Figure 2. While this apparatus is shown with a fixed baffle 39, the modifications shown in Figures 3 and 4 may also be applied where more than one point of introduction of liquid hydrocarbon charge is desired.

Figure 6 shows a further modification of this invention, and like parts in Figure 6 and all of the aforementioned figures bear the same numerals. In Figure 6 there is shown a conduit 91 extending centrally upwardly from the upper end of vessel 10 and terminating thereabove. The upper end of conduit 91 is closed off by means of a flange 92 with a stuffing box 93 therethrough. Intermediate the upper and lower ends of conduit 91 is a valve 94 capable of closing off the upper section of 91 from communication with vessel 10. Extending through stuffing box 93 and terminating within central tubular conduit 37 depending from transverse partition 33 is a liquid charge pipe 95. Fixed to the lower end of pipe 95 is a spray nozzle 96. Depending centrally downwardly from the upper end of vessel 10 within seal chamber 34 is a cylindrical member 97. A plurality of supports 98 depend laterally outwardly from the inside of cylinder 97. A sleeve 99 fits loosely about pipe 95 and extends from a vertical level near the upper end of vessel 10 within cylinder 97 to a level within central conduit 37 above spray nozzle 96. Sleeve 99 should be greater in lateral dimensions than nozzle 96. A flange 100 is attached to the upper end of sleeve 99 and rests on supports 98 to maintain sleeve 99 in position. The lower end of sleeve 99 is less in lateral dimensions than conduit 37 so that an annular space 101 is formed between the lower end of the sleeve and the conduit.

In operation contact material at a temperature suitable for the desired conversion enters seal chamber 34 through gravity feed leg 12. Contact material gravitates from the seal chamber through conduits 36 onto the surface of contact material bed 38. Contact material also gravitates from the seal chamber through annular space 101 into conduit 37 from which the contact material showers downwardly onto the surface of column 38. Liquid hydrocarbon charge enters through pipe 95 and is sprayed onto the contact material within chamber 37 and showers downwardly with the contact material onto column 38. The operation then proceeds as previously described.

This modification of the invention has several advantages not shown in previous modifications. The liquid charge pipe 95 is shielded from contact with the moving contact material so that no erosion of the pipe will occur. Liquid charge pipe 15 may be removed from vessel 10 for cleaning or repairs without interruption of the operations within the vessel. This is accomplished by withdrawing the pipe through sleeve 99 from the vessel into the upper section of conduit 91. Valve 94 is then closed and flange 92 with pipe 95 therethrough is removed from conduit 91. Also, a protective blanket of seal gas is maintained around pipe 95 and nozzle 96 to prevent coke formation on these parts. Seal gas flows from seal chamber 34 down sleeve 99 and is discharged around nozzle 96. The system for removal of the liquid feed pipe and nozzle from the reactor shown in Figure 6 is claimed broadly in U. S. patent application, Serial No. 311,286, filed September 24, 1952, but the combination of that system with the liquid feed system shown here is part of this invention.

The modifications shown in Figure 3 and Figure 4 may also be applied to the apparatus of Figure 6 by providing a suitable mechanism for varying the height of sleeve 99.

The exact dimensions of the various elements making up the improved apparatus of this invention will, of course, depend to a certain extent upon the particular operation and the operating conditions involved. Referring to Figure 2 it is desirable that the ratio of the horizontal cross-sectional area of vessel 10 to the horizontal cross-sectional area of conduit 37 be broadly within the range about 250 to 10 and preferably within the range about 60 to 40. The horizontal cross-sectional area of conduit 37 and deflecting baffle 39 will also depend on the rate of flow of contact material through the conversion vessel and on the percentage of the total flow which passes through conduit 37. For example for a contact material flow rate of 300 tons/hour where 80 per cent of the total contact material passed through conduit 37 the horizontal cross-sectional area of conduit 37 would be about 4 sq. ft. and the horizontal cross-sectional area of deflecting baffle 39 would be about 2 sq. ft. While tubular conduit 37 and baffle 39 are shown in center of a horizontal cross-section of the conversion vessel it is not necessary within the broader scope of this invention that these elements be so placed. It is desirable, however, that they be removed a reasonable distance from the walls of vessel 10. It has also been found desirable to provide a vertical distance of about 5 to 10 feet between lower end of conduit 37 and the surface of the contact material column in the conversion chamber. The surface of the contact material column should be maintained within a narrow range of levels falling within a vertical length of the column amounting to about two inches. The vertical length of the column may vary from about three to 40 feet depending on the process. Where baffle 39 is fixed in position any desired amount of contact material may pass through conduits 36. It is desirable, however, that these conduits carry from 10 to 50 per cent of total contact material circulated.

Operating conditions within the conversion zone vary widely depending on the particular application. In some conversions the liquid hydrocarbons may be introduced to the conversion chamber cold but it is generally preferable to heat the liquid charge to a temperature of the order of about 600–850° F. before spraying it into the conversion chamber. The velocity of the liquid as it flows from the end of the pipe or nozzle through which it is introduced to the conversion chamber should be great enough so that after impinging on baffle 39 liquid will completely penetrate the curtain of contact material emerging from annular passage 41. Generally, this may be accomplished by velocities in the range about 5 to 50 feet per second. Contact material should be introduced into the conversion chamber at a temperature suitable to support the desired conversion without the contact material being cooled to a temperature below that at which hydrocarbon conversion proceeds at a practical rate. The contact material inlet temperature may vary from about 700° F. to 1700° F. depending upon the operation. The ratio of contact material to liquid oil charge to the conversion chamber may be within the range of about 1.5 to 20 parts of contact material by weight per part of oil.

This invention should be understood to cover all changes and modifications of the examples of the invention herein chosen for purposes of disclosure, which do not constitute departures from the spirit and scope of the invention.

I claim:

1. A process for conversion of high boiling liquid hydrocarbons to lower boiling hydrocarbons in the presence of a particle-form contact material which comprises, maintaining a bed of said contact material in a lower portion of a confined housing while maintaining a bed-free space above said bed in an upper portion of said housing, withdrawing contact material from the lower section of said bed to promote downward movement of the particles in said bed, introducing fresh contact material in heated condition into the upper section of said space as a confined tubular shower of particles falling freely along the walls of a tubular pasage so as to continuously scrub the walls of said passage, of said passage being located a substantial distance inwardly from the housing walls and having a horizontal cross-sectional area amounting to only a minor fraction of the cross-sectional area of said bed-free space; spraying the liquid hydrocarbon feed into said shower within said passage to contact said falling particles and becoming sorbed thereon, causing the particles of contact material bearing the sorbed hydrocarbons to drop from the lower end of said tubular passage and then through a substantial vertical portion of said bed-free space onto said bed therebelow, continuing the contact within said bed to effect completion of the conversion to lower boiling products and withdrawing the hydrocarbon products from said housing separately of the contact material.

2. An apparatus for conversion of hydrocarbons which comprises, in combination, an upright conversion vessel having an outlet for contact material at its lower end, a tubular inlet for contact material extending downwardly into the upper section of said vessel, deflecting baffle of smaller lateral dimensions than said tubular inlet suspended centrally down into the upper section of said inlet so as to provide an annular passage between the walls of the inlet and said baffle along an upper portion of the length of said tubular inlet, an inlet conduit for liquid hydrocarbon charge extending into said vessel from the exterior and terminating on its upwardly facing open discharge end within said tubular inlet directly below said deflecting baffle, means to control a contact material bed level in said vessel a substantial distance below the lower end of said tubular inlet and means to withdraw hydrocarbon products from said vessel.

3. A process for the conversion of high boiling liquid hydrocarbons to lower boiling hydrocarbons in the presence of a particle-form contact material which comprises, introducing fresh contact material at a temperature suitable for conversion into the upper section of a confined, elongated vessel, passing contact material from the upper section of said vessel as a confined tubular curtain so that contact material particles fall freely along the walls of a tubular passage located a substantial distance inwardly from the vessel walls and having a horizontal cross-sectional area only a minor fraction of the horizontal cross-sectional area of said vessel, passing said tubular curtain downwardly from the lower end of the tubular passage onto a bed of contact material particles maintained a substantial distance below the lower end of said tubular passage, discharging a stream of liquid hydrocarbon charge upwardly against a baffle maintained within said tubular curtain so that the liquid hydrocarbon sprays from the baffle and mixes with the falling particles, becomes sorbed thereon and falls with said particles onto said bed, continuing the contact of liquid hydrocarbons and contact material particles within said bed to effect completion of the conversion to lower boiling products, withdrawing the hydrocarbon products from said vessel separately of the contact material, withdrawing the used contact material from the lower section of said vessel.

4. A method for the conversion of high boiling liquid hydrocarbons to lower boiling gaseous hydrocarbon products in the presence of a moving particle-form contact material mass which method comprises, maintaining a compact bed of particle-form contact material within a confined seal zone, supplying fresh contact material to said seal zone at a temperature suitable for supporting conversion of said liquid hydrocarbons, maintaining a confined elongated conversion zone below said seal zone, maintaining a confined compact column of contact material particles within said conversion zone, maintaining a space substantially free of compacted contact material above said contact material column within said conversion zone, passing contact material as a plurality of confined streams from said seal zone onto said column within said conversion zone, also passing contact material from said seal zone as a confined tubular shower of particles falling freely along the walls of a vertical tubular passage which terminates within said space a substantial distance above said column, discharging a stream of liquid hydrocarbon charge upwardly within said tubular passage, deflecting said hydrocarbon stream so that the liquid hydrocarbons contact the freely falling contact material particles and become sorbed thereon, causing the contact material particles bearing the sorbed hydrocarbons to drop from the lower end of said tubular passage through the remainder of said space onto the column of contact material maintained therebelow, continuing contact of hydrocarbons and contact material within said column to complete the conversion of said hydrocarbons to lower boiling gaseous products, withdrawing said products from the conversion zone separately of the contact material, withdrawing contact material from the lower end of said contact material column to promote the downward movement of contact material within the conversion zone and maintaining a gaseous pressure in said seal zone above the pressure in said conversion zone.

5. A process for the conversion of high boiling liquid hydrocarbon charge to lower boiling gaseous hydrocarbon products in the presence of a moving bed of contact material particles which process comprises, maintaining a substantially compact bed of contact material in a confined seal zone, supplying contact material to said bed at a temperature suitable for supporting the conversion of the liquid hydrocarbons, passing contact material from the lower section of said bed as a tubular shower through a tubular passage and along the walls thereof into the upper section of a confined conversion zone, said tubular passage being of such a size that the ratio of the horizontal cross-sectional area of the conversion zone to the horizontal cross-sectional area of the tubular passage is within the range about 250 to 10, passing contact material as a shower of freely falling particles from the lower end of said tubular passage through a vertical section of said conversion zone onto the surface of a substantially compact column of contact material maintained at a lower level in said conversion zone, passing a stream of liquid hydrocarbon charge upwardly within said tubular passage, deflecting the flow of said stream into the tubular shower of contact material particles within said tubular passage so that said liquid hydrocarbons become sorbed on said contact material particles, passing said contact material and liquid hydrocarbon charge downwardly through said column to effect the conversion of the liquid hydrocarbons to lower boiling gaseous hydrocarbon products, withdrawing used contact material from the lower section of said conversion zone, withdrawing gaseous hydrocarbon products from said column substantially separately of the contact material, controlling the level of the surface of said column substantially constant by adjustably regulating the flow of contact material within said tubular passage and maintaining an inert gaseous pressure in said seal zone above the gaseous pressure in said conversion zone.

6. An apparatus for conversion of high boiling liquid hydrocarbons to lower boiling gaseous hydrocarbons in the presence of a moving contact mass material which comprises in combination, a substantially vertical elongated vessel, partitioning across the upper section of said vessel adapted to divide it into an upper seal chamber and a lower conversion chamber, means to introduce contact material into said seal chamber, means to introduce seal gas into said seal chamber, a tubular conduit depending centrally and vertically downwardly from said partition and terminating within the upper section of said conversion chamber, a deflecting baffle of smaller lateral dimensions than said tubular conduit fixed centrally into the upper section of said tubular conduit so as to provide an annular passage between the walls of the tubular conduit and said baffle, an inlet conduit for liquid hydrocarbon charge extending into said vessel from the exterior and terminating on its upwardly facing open discharge end within said tubular conduit directly below said deflecting baffle, a plurality of conduits extending downwardly from said seal chamber a substantial vertical distance greater than said central tubular conduit and adapted to maintain a compact column of contact material immediately beneath their termination points, means to withdraw hydrocarbons from said vessel separately of the contact material bed, means to withdraw contact material from said vessel.

7. An apparatus for the conversion of high boiling liquid hydrocarbons to lower boiling gaseous hydrocarbons in the presence of a moving contact mass material which apparatus comprises, means defining a conversion chamber adapted to confine a substantially compact column of particle-form contact material, a tubular inlet conduit extending downwardly into the upper section of said conversion chamber for the supply of contact material, a vertically movable deflecting baffle suspended in the upper section of said tubular inlet conduit so as to define an annular passage between the walls of the baffle and the inlet conduit, said baffle and said inlet conduit being of such a size and shape with relation one to the other that as the baffle is moved upwardly or downwardly the size of the annular passage will vary, a liquid hydrocarbon charge conduit extending into said chamber and terminating on its upwardly facing open discharge end directly below said deflecting baffle, means connected to said deflecting baffle to adjust its vertical height from a location outside said chamber and thereby vary the size of said annular passage, means to remove gaseous hydrocarbon products from said chamber separately of said contact material column, means to remove contact material from the lower section of said conversion vessel.

8. An apparatus for the conversion of high boiling liquid hydrocarbon charge to lower boiling gaseous hydrocarbon products in the presence of a moving mass of contact material particles which apparatus comprises, a substantially vertical elongated vessel, partitioning across the upper section of said vessel adapted to divide it into an upper seal chamber and a lower conversion chamber, means for supplying contact material to said seal chamber, means for supplying inert seal gas to said seal chamber, a plurality of tubular conduits depending downwardly from said partition into the upper section of said conversion chamber, a plurality of deflecting baffles one suspended centrally in the upper section of each of the tubular conduits so as to define an annular passage therein between the walls of the baffle and the conduit, a liquid hydrocarbon charge conduit manifolded to a plurality of vertical conduits one terminating directly beneath each of the deflecting baffles within each of said tubular conduits and adapted to discharge streams of liquid hydrocarbon charge upwardly against each of said deflecting baffles, means to maintain the surface level of a compact column of contact material a substantial vertical distance beneath the lower ends of said tubular conduits, means to remove contact material from the lower end of said conversion chamber, means to remove gaseous hydrocarbon product from said conversion chamber separately of said contact material column.

9. An apparatus for the conversion of high boiling liquid hydrocarbons to lower boiling gaseous hydrocarbons in the presence of a moving particle-form contact mass material which apparatus comprises, means defining an elongated conversion chamber adapted to confine a compact column of contact material, means defining a seal chamber positioned above said conversion chamber and adapted to confine a compact bed of contact material, means to introduce an inert seal gas to said seal chamber, means to introduce contact material to said seal chamber, a tubular conduit extending from the lower section of said seal chamber into the upper section of said conversion chamber for the supply of contact material to the conversion chamber, a deflecting baffle capable of being moved vertically upwardly or downwardly suspended in the upper section of said tubular conduit so as to define an annular passage between the walls of said baffle and said tubular conduit, said baffle and said conduit being of such a size and shape with relation one to the other that as the baffle is moved vertically upwardly or downwardly the cross-sectional area of said annular passage will vary, a liquid hydrocarbon charge conduit extending into said conversion chamber and terminating on its upwardly facing open discharge end directly below said deflecting baffle, a level measuring device positioned within said conversion chamber a spaced distance below the end of said tubular conduit and adapted to measure the surface level of the contact material column within said chamber, mechanism actuated by said measuring device adapted to adjust the vertical position of said deflecting baffle in response to changes in the surface level of said column in such a manner as to maintain said surface level of said column within a narrow range of levels all spaced substantially below the lower end of said tubular conduit, means to withdraw gaseous products from said conversion chamber substantially separately of said contact material, means to withdraw contact material from said conversion chamber.

10. A process for the conversion of high boiling liquid hydrocarbons to lower boiling hydrocarbons in the presence of a moving contact material mass which process comprises, maintaining a substantially compact bed of particle-form contact material within the lower section of a confined conversion zone, maintaining a gas space above said bed in the upper section of said conversion zone, confining at least a portion of said gas space laterally and above by means of solid surfaces, said enclosed portion having a horizontal cross-sectional area amounting to only a minor fraction of the horizontal cross-sectional area of said bed, removing contact material from the lower section of said bed, supplying contact material to the upper section of said conversion zone, spraying a liquid hydrocarbon charge into said laterally confined gas space toward said solid surfaces, passing at least a portion of the contact material supplied to said conversion zone downwardly as a circumferentially complete stream over said laterally confining surfaces which are below and immediately above the point of introduction of said liquid charge whereby said lateral surfaces will be scrubbed free of any coke which forms on said lateral surfaces, passing the liquid hydrocarbon charge downwardly through said bed to effect its conversion to lower boiling hydrocarbons and removing said lower boiling hydrocarbons from the conversion zone.

11. A process for the conversion of high boiling liquid hydrocarbons to lower boiling hydrocarbons in the presence of a particle-form contact material which comprises, maintaining a bed of said contact material in a lower portion of a confined housing while maintaining a bed-free space above said bed in an upper portion of said housing, withdrawing contact material from the lower section of said bed to promote downward movement of the particles in said bed, introducing fresh contact material in heated condition into the upper section of said space as a confined circumferentially complete shower falling freely along substantially the entire length of the walls of a laterally confined passage located a substantial distance inwardly from the housing walls and having a horizontal cross-sectional area amounting to only a minor fraction of the cross-sectional area of said bed-free space, spraying the liquid hydrocarbon feed into said shower within said passage from a point centrally within the shower to contact said falling particles, causing the particles and liquid hydrocarbons to drop from the lower end of said passage and then through a substantial vertical portion of said bed-free space onto said bed therebelow, continuing the contact of hydrocarbon and contact material within said bed to effect completion of the conversion to lower boiling products and withdrawing the hydrocarbon products from said housing separately of the contact material.

12. An apparatus for the conversion of high boiling liquid hydrocarbons to lower boiling gaseous hydrocarbons in the presence of a substantially compact column of particle-form contact material which comprises in combination, an upright, substantially vertical vessel adapted to confine a substantially compact column of particle-form contact material, a partition extending transversely across the upper section of said vessel so as to divide said vessel into a seal chamber above said partition and a conversion chamber therebelow, means for introducing contact material into said seal chamber, a tubular conduit extending through said partition and terminating within the upper section of said conversion chamber, said conduit being of a size such that the ratio of the horizontal cross-sectional area of said chamber to the horizontal cross-sectional area of said conduit is within the range about 250 to 10, a liquid charge pipe extending substantially vertically into said vessel from the exterior and terminating within said tubular conduit, a spray nozzle attached to the lower end of said pipe within said tubular conduit, a sleeve fitted loosely about said pipe within said vessel and terminating within the upper section of said tubular conduit above said spray nozzle so that a flow throttling annular passageway is defined between said sleeve and said conduit, means for supplying contact material to the upper end of said annular passageway, whereby said contact material will flow downwardly along the walls of said conduit to scrub coke therefrom, means for maintaining the upper surface of said compact column of contact material at a vertical level below the lower end of said tubular conduit, means for removing gaseous hydrocarbons from the lower section of said conversion chamber and means for removing contact material from the lower section of said conversion chamber.

13. An apparatus for the conversion of high boiling liquid hydrocarbon charge to lower boiling gaseous hydrocarbons in the presence of a substantially compact column of particle-form contact material which comprises in combination, an upright, substantially vertical vessel adapted to confine a substantially compact column of particle-form contact material within its lower section, a partition extending transversely across the upper section of said vessel so as to divide said vessel into a seal chamber in the upper end of said vessel above said partition and a conversion chamber therebelow, means for introducing contact material into said seal chamber, means for introducing inert seal gas into said seal chamber, a tubular conduit depending centrally downwardly from said partition and terminating within the upper section of said conversion chamber, said tubular conduit being of a size such that the ratio of the horizontal cross-sectional area of said chamber to the horizontal cross-sectional area of said tubular conduit is within the range about 60 to 40, a conduit extending centrally upwardly from and through the upper end of said vessel and terminating thereabove, a valve on said last named conduit intermediate its upper and lower ends, a stuffing box closing off the upper end of said conduit, a liquid hydrocarbon charge pipe extending vertically through said stuffing box and through said seal chamber and terminating within said tubular conduit, a spray nozzle attached to the lower end of said pipe, a sleeve fitting loosely about said pipe and extending from a vertical level near the upper end of said vessel into the upper section of said tubular conduit and terminating at a level above said spray nozzle, a plurality of conduits depending downwardly from said partition and terminating at a level within said conversion chamber below the lower end of said tubular conduit, means for removing gaseous hydrocarbons from said conversion chamber and means for removing contact material from said conversion chamber.

14. A process for the conversion of high boiling liquid hydrocarbons to lower boiling hydrocarbons in the presence of a particle-form contact material which comprises: maintaining a bed of said contact material in a lower portion of a confined housing while maintaining a bed-free space above said bed in an upper portion of said housing, withdrawing contact material from the lower section of said bed to promote downward movement of the particles in said bed and supplying contact material in heated condition to the upper section of said bed to replenish said bed, introducing at least 50 per cent of the contact material to be supplied to said bed into the upper section of the bed-free space as a confined circumferentially complete tubular shower of particles falling freely along substantially the entire length of the walls of a tubular passage located a substantial distance inwardly from the housing walls, said tubular passage being of such a size that the ratio of the horizontal cross-sectional area of the bed-free space to the horizontal cross-sectional area of the tubular passage is within the range about 250 to 10 whereby the walls of said tubular passage are thoroughly scrubbed by the falling contact material, spraying liquid hydrocarbon charge into said tubular shower within said passage to effect a thorough mixing of contact material and liquid charge while in said passage, causing the particles of contact material mixed with hydrocarbons to drop from the lower end of said tubular passage and then through a substantial vertical portion of said bed-free space onto said bed therebelow, continuing the contacting of hydrocarbons and contact material within said bed to effect completion of the conversion to lower boiling products and withdrawing the products from the housing separately of contact material.

15. An apparatus for the conversion of high boiling hydrocarbons, at least partially in the liquid phase, to lower boiling hydrocarbons in the presence of a moving contact mass material, which comprises in combination: an upright conversion vessel adapted to confine a substantially compact column of particle-form contact material, a contact material outlet from the lower section of said passageway, a tubular chamber open on upper and lower ends extending into said vessel and of a size such that the ratio of the horizontal cross-sectional area of said vessel to the horizontal cross-sectional area of said chamber is within the range about 60 to 40, a baffle member extending into the upper section of said chamber and terminating therein so as to form an annular flow throttling passageway for contact material flow between the outer periphery of said baffle and the inner surfaces of said wall, means for supplying contact material to said annular passageway whereby the contact material will flow downwardly along the walls of said chamber and scrub said walls, a liquid spray means situated within said chamber below said baffle member and adapted to spray liquid hydrocarbon charge into said contact material as it falls along said walls, means to supply liquid hydrocarbon charge to said spray means, means to maintain the upper surface of said compact column at a vertical level below the lower end of said tubular chamber, and means for removing products of the conversion from the lower section of said vessel.

16. An apparatus for the conversion of high boiling liquid hydrocarbons to lower boiling hydrocarbons in the presence of a moving contact material mass, which comprises in combination: members defining a conversion chamber adapted to confine a substantially compact bed of particle-form contact material in its lower section, means to maintain the surface of said bed at a level in the upper section of said chamber below the upper end of said chamber, solid members laterally confining a space above said bed in said chamber, said confined space being of a size such that the ratio of the horizontal cross-sectional area of said chamber to the horizontal cross-sectional area of said space is within the range about 250 to 10 and said space opening on its lower end to the portion of the chamber therebelow, members defining at least one passageway for contact material flow into said confined space of less horizontal cross-sectional area than said chamber, a deflecting member within said confined space adapted to deflect the contact material supplied through said passageway against the solid members confining said space as a circumferentially complete stream and adapted to cause said stream to flow down said solid members and scrub them, means for spraying liquid hydrocarbon charge into said space and into said falling contact material in the region beneath said deflecting member, means for removing products of conversion from said chamber and means for removing contact material from the lower section of said chamber.

References Cited in the file of this patent

UNITED STATES PATENTS

| | | |
|---|---|---|
| 2,458,162 | Hagerbaumer | Jan. 4, 1949 |
| 2,492,998 | Lassiat | Jan. 3, 1950 |
| 2,493,036 | Savage et al. | Jan. 3, 1950 |
| 2,520,146 | Houdry | Aug. 29, 1950 |
| 2,548,286 | Bergstrom | Apr. 10, 1951 |
| 2,556,514 | Bergstrom | June 12, 1951 |
| 2,561,420 | Schutte | July 24, 1951 |
| 2,574,850 | Utterback et al. | Nov. 13, 1951 |
| 2,687,372 | Ray | Aug. 24, 1954 |